Figure 2:
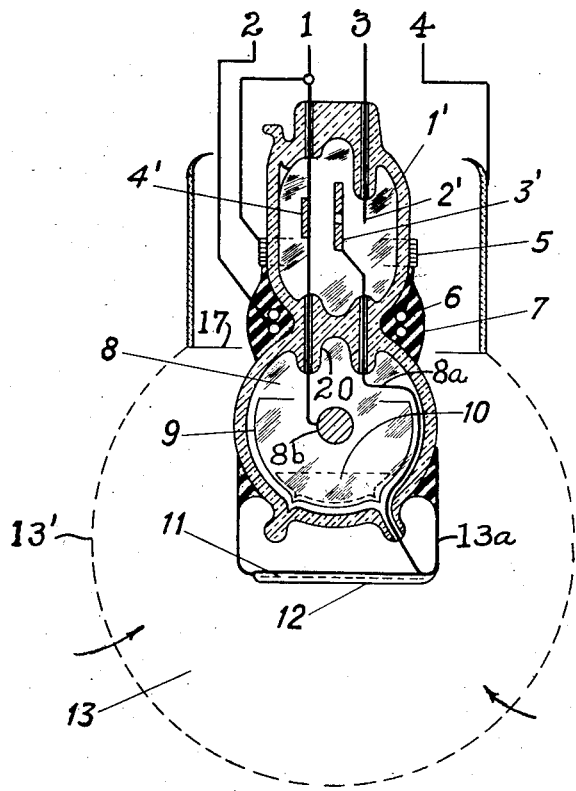

March 29, 1949.   W. C. JAEGER   2,465,377
GAS-SENSING CONTROL MEANS WITH
GAS-DISCHARGE DEVICE
Filed June 3, 1942

WALTER C. JAEGER
INVENTOR

ATTORNEYS

Patented Mar. 29, 1949

2,465,377

UNITED STATES PATENT OFFICE 2,465,377

GAS-SENSING CONTROL MEANS WITH GAS-DISCHARGE DEVICE

Walter C. Jaeger, Maienfeld, Switzerland, assignor to Banque pour Entreprises Electriques, Zurich, Switzerland, a Swiss company Application June 3, 1942, Serial No. 445,564
In Germany November 24, 1938

Section 1, Public Law 690, August 8, 1946
Patent expires November 24, 1958

4 Claims. (Cl. 315—156)

In the case of ionization, for instance by means of a radio-active preparation, of a gas located between electrodes of various potential, a slight electric current flows between the electrodes and through the source of potential with which the electrodes are connected. The magnitude of this current varies according to the arrangement of the electrodes and to the difference of potential between them, and also according to the nature and intensity of the ionizing source. Assuming the above conditions to be constant the current may be modified as the result of the following properties of the gas located between the electrodes:

(1) Number of gas molecules per cm³, i. e. pressure and temperature of the gas.
(2) Nature of the gas molecule, i. e. chemical composition of the gas.
(3) State of the gas molecule, i. e. physical nature of the gas, for instance ionization, condensation, etc.
(4) Suspended matter in the gas, for instance dust, smoke, fog.

When the air between the electrodes comes from the neighbourhood of a combustion the electric current is considerably lower than normal. By means of a suitable arrangement on the lines indicated above, i. e. through gas testing in an ionization chamber, it is therefore possible to devise a sensitive appliance for the purpose of fire alarm. The present invention generally relates to an arrangement for testing a gas by ionizing it and testing it in an electric field.

A method is known for ascertaining the gas variations above referred to, by measuring the current flowing through an ionization chamber, and also its variation as subject to gas variation. This current variation is, however, very slight, and its measuring, consequently, most difficult.

A method is also known by which the potential variation of an electrode of the ionization chamber is used for ascertaining the gas variation. This method is considerably simpler, and has consequently been included as part of the present invention.

Potential variations have hitherto been ascertained by measuring the potential with an electrometer, in doing which electrical forces cause a mechanical motion to take place, or else by using electron tubes for transforming this potential variation into an electric current. These methods, however, involve serious drawbacks, since remote transmission is connected with considerable difficulties.

This is due to the fact that when using electrostatic instruments the motion of a needle or hand has to be converted into an alarm. This is only possible in a practical way by means of a photo-electric cell which in its turn requires further complicated appliances. The use of electron tubes entails further amplifying steps or extremely sensitive relays. Consequently, by using these methods it is impossible to design a small, cheap and reliable appliance for giving alarm as and when gas variations reach a certain point.

According to the present invention, on the contrary, it is possible to design a small, sturdy and cheap alarm device based on the principle described above. This is attained by the combination and direct assembling of ionization chambers with a controlled gas discharge tube.

In the method according to the present invention the variation of the potential of an electrode located in an ionization chamber is used to bring about or control a gas discharge in an enclosed system filled with a suitable gas under suitable pressure.

Figure 1:
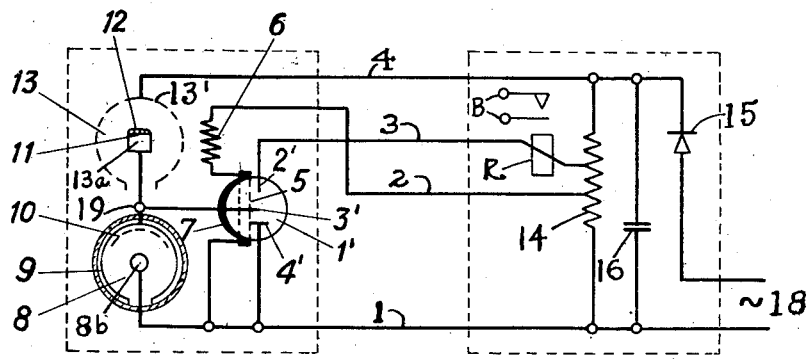

A preferred embodiment of the invention is illustrated on the accompanying drawing, wherein Fig. 1 shows the simplified wiring diagram according to the invention, and Fig. 2 illustrates a schematic representation of the structure itself.

The gas to be tested is tested in the ionization chamber 13 whose wall 13' is perforated or made of netting to give access to the gas. It is ionized by the radio-active preparation 11 which is protected by a protective layer 12. Connected in series with this testing ionization chamber is a second control ionization chamber 8 in which the radio-active preparation 10 is applied on to the conducting layer 9. From the current source there flows an electric current through the line 1, the control chamber 8 and the testing chamber 13, and back to the current source over the line 4 a high ohmic resistance 14 shunting the ionization chambers. Through the two ionization chambers the voltage is divided up between lines 1 and 4, the ionization chamber 8 taking part of the voltage and the ionization chamber 13, the remaining part of the voltage.

To attain this division of voltage, a conventional resistance can be used as well, instead of the control chamber 8. In order to reach the utmost sensitivity it is, however, advisable to use a control chamber.

For indicating gas variations bringing about variations of the inner resistance of the ionization chamber 13, the glow relay 1', is used which is directly fitted to the control ionization chamber 8. In this glow relay a current can flow from the cathode 4' to the anode 2', actuating over the lines 1 and 3 a normal telephone relay R.

Over any suitable alarm contacts B the telephone relay R may release any desired switch connections. The ionization chamber 13 and the glow relay are so attuned to each other that, when the appliance is in working readiness, there is at the control electrode 3' of the glow relay such a voltage that no gas discharge may ignite between cathode 4' and anode 2'. In the event of a variation of the inner resistance of the ionization chamber 13, for instance as the result of a gas variation, the potential of the control electrode 3' is modified and enabled to ignite a gas discharge between the cathode 4' and the anode 2'.

Both the current flowing through the ionization chamber, and its variation in accordance with the gas composition, are very slight. Consequently, since the operation is based on the ascertaining of the potential of an electrode, the insulation of this electrode must satisfy very strict requirements to make the process practicable at all. By a direct combination of the testing ionization chamber 13, the control chamber 8 and the glow relay 1 it is possible to limit trouble due to insulation defects or to outside capacitive or inductive influences to such an extent that a suitable device can be designed for practical working. Even with the above three elements combined and assembled together there remains a surface in contact with the outer air and which therefore must be highly insulated. According to a constructional example of the present invention this particular spot of the insulation is carried out by covering the portion of the chamber of the glow relay or the control chamber, made of glass- or ceramic-like material, which directly overlies the electrode with a coating 7 of a suitable substance, for instance a wax-like substance. Furthermore, the insulation is partitioned off from the gas room proper by a partition wall 17. In order to prevent the insulation from being spoiled or rendered temporarily ineffective by water vapour precipitated on it, one constructional example of the present invention makes provision for the heating of the insulation by means of the heating winding 6.

In order to ensure that alarm shall be given even in the event of a defect or weakening of the insulation a protective ring 5 has been provided. This protective ring 5 is connected with such a potential that in the event of a defect in the insulation the potential of the control electrode 3' undergoes a variation which causes a gas discharge to ignite, i. e., when the device is used as alarm signal, it causes an alarm to be given. In the switch connection shown on the illustration, for instance, the potential difference between the control electrode 3' and the cathode 4' is lowered when combustion gases enter the ionization chamber 13, or likewise when the insulation over 7 becomes defective.

In the form of the invention illustrated, the electrode 3' is connected to the series-connected electrodes of the two ionization chambers, as indicated schematically at 19 in Fig. 1. As shown in Fig. 2, the electrode 3' is connected with the inner electrode 13a of the chamber 13 by way of a connection 8a which at the same time forms an electrode of the chamber 8. The second electrode of the chamber 13 is represented by the perforated wall 13' of the chamber, such wall being connected electrically to the lead 4 connected with the source of power. The second electrode of the chamber 8 is shown at 8b. The latter is connected by way of a lead which, like the lead running from the electrode 8a, passes through the insulating partition wall 20 between the chamber 8 and the tube 1', with the electrode 4' which in turn is connected with the lead 1 likewise running to the source of power.

In the operation of the above described mechanism, the condenser 16 is continuously charged by current supplied by the alternating source 18 after rectification by the rectifier 15. The ionization of the gases in the chambers 8 and 13 by the radioactive material enables a minute current to pass through these chambers in series. Under normal conditions there is thus established a more or less fixed potential on the electrode 3' of the gas discharge tube. When, however, the character of the gas entering the chamber 13 changes, the current flow will likewise change and the potential on the electrode 3' will vary accordingly. The electrical characteristics of the tube 1' are so determined that upon a predetermined alteration in the potential of the ignitor electrode 3', the condenser 16 will be discharged across the electrodes 2' and 4', the current acting to operate the relay R and contacts B or other suitable devices.

As will be clear from the foregoing, and as shown in Fig. 1 of the drawing, the electrically controlled apparatus comprising the relay R, resistance 14, rectifier 15, and capacity 16 is responsive to the operation of the gas discharge lamp 1'. This lamp will discharge the condenser upon the development of an appropriate potential upon the control electrode 3', for example, when the potential on such electrode falls. This will occur when the ionized gas in the chamber 13 is of such character that the resistance between the electrodes of the chamber falls, which will happen for example, when combustion gases and smoke enter the chamber. As the gas discharge lamp can be made highly sensitive, and as disturbing factors can be reduced to a minimum by combining the several parts into a unitary structure, as shown in Fig. 2, so that only one area needs to be highly insulated to insure proper working of the lamp, as explained above, it will be seen that I have provided an efficient and reliable apparatus for detecting changes in the character of a gas entering the chamber 13.

I claim:

1. Apparatus for testing gases, comprising a chamber for receiving the gas to be tested, means for ionizing the gas in said chamber, two electrodes connected with a source of electric potential and connected in a circuit in which a variation of the inner resistance of the ionization chamber produces a change in voltage, said electrodes being disposed with the gas to be tested between them, a gas discharge lamp having spaced electrodes and adapted to be ignited upon change in the electric field between said electrodes, means responsive to a change in potential on one of the first-named electrodes and arranged to control the electric field in said gas discharge lamp, a support for said one electrode, said support and the gas discharge lamp being united into a unitary structure wherein only one area requires to be highly insulated, and a heating winding for heating the said area to minimize the deposition of moisture thereon.

2. Apparatus for testing gases, comprising a chamber for receiving the gas to be tested, means for ionizing the gas in said chamber, two electrodes connected with a source of electric potential and connected in a circuit in which a variation of the inner resistance of the ionization chamber produces a change in voltage, said electrodes being disposed with the gas to be tested between them, a gas discharge lamp having spaced electrodes and adapted to be ignited upon change in the electric field between said electrodes, means responsive to a change in the potential on one of the first-named electrodes and arranged to control the electric field in said gas discharge lamp, a support for the said one electrode, said support and the gas discharge lamp being united into a unitary structure wherein only one area requires to be highly insulated, and a partition wall for screening the said area from the outer air.

3. Apparatus for testing gases, comprising a chamber for receiving the gas to be tested, means for ionizing the gas in said chamber, two electrodes connected with a source of electric potential and connected in a circuit in which a variation of the inner resistance of the ionization chamber produces a change in voltage, said electrodes being disposed with the gas to be tested between them, a gas discharge lamp having spaced electrodes and adapted to be ignited upon change in the electric field between said electrodes, means responsive to a change in the potential on one of the first-named electrodes to control the electric field in said gas discharge lamp, a support for the said one electrode, said support and the gas discharge lamp being united into a unitary structure wherein only one area requires to be highly insulated, and a protective ring about the gas discharge lamp and connected with the circuit of the gas discharge lamp to cause the latter to ignite if the insulation is defective.

4. Apparatus for testing gases and particularly for detecting the presence of combustion gases or smoke, comprising an ionizing chamber having access for the gas to be tested, a second ionizing chamber sealed against the gas to be tested, two spaced electrodes in each of said chambers, an electrode of each chamber being connected together so that said chambers are electrically in series, a source of electric potential connected to the two other electrodes of said chambers, and a gas discharge tube having two spaced electrodes connected with a source of potential and a third electrode joined to the connected electrodes of the two ionizing chambers, said third electrode being arranged to affect the discharge in said tube upon change in the electrical properties of the gas in the first-mentioned ionizing chamber.

WALTER C. JAEGER.

REFERENCES CITED

The following references are of record in the file of this patent:

UNITED STATES PATENTS

| Number | Name | Date |
| --- | --- | --- |
| 878,456 | Darwin | Feb. 4, 1908 |
| 899,068 | Philip et al. | Sept. 22, 1908 |
| 1,304,208 | Shakespear | May 20, 1919 |
| 1,632,074 | Housekeeper | June 14, 1927 |
| 1,746,525 | Darrah | Feb. 11, 1930 |
| 1,953,244 | Luckey et al. | Apr. 3, 1934 |
| 2,122,222 | Vingerhoets | June 28, 1938 |
| 2,278,248 | Darrah | Mar. 31, 1942 |
| 2,383,600 | Grosdoff | Aug. 28, 1945 |

FOREIGN PATENTS

| Number | Country | Date |
| --- | --- | --- |
| 720,180 | Germany | Apr. 27, 1942 |